United States Patent [19]

Kaplan

[11] 4,290,043
[45] Sep. 15, 1981

[54] METHOD OF AND SYSTEM FOR DETECTING MARINE OBSTACLES

[76] Inventor: Irwin M. Kaplan, 7 Barnett Pl., East Northport, N.Y. 11731

[21] Appl. No.: 85,239

[22] Filed: Oct. 16, 1979

[51] Int. Cl.³ .................... G08G 3/02; G01C 3/08
[52] U.S. Cl. ........................................ 340/29; 340/34; 356/5; 356/152; 250/342; 455/604; 455/606
[58] Field of Search .......... 340/29, 27 NA, 28, 32–34, 340/38 P, 555, 556, 557; 356/141, 152, 3, 4, 5; 250/203, 338, 342, 214 B, 214 RC; 116/26, 27, DIG. 43; 455/600, 601, 602, 605, 606, 608, 604

[56] References Cited

U.S. PATENT DOCUMENTS

| | | | |
|---|---|---|---|
| 3,604,803 | 9/1971 | Kahn ........................... | 356/5 |
| 3,689,156 | 9/1972 | Kerpchar ..................... | 356/5 |
| 3,752,582 | 8/1973 | Troll et al. ................... | 356/5 |
| 3,781,111 | 12/1973 | Fletcher et al. ............. | 356/5 |
| 3,812,372 | 5/1974 | Wirtz et al. .................. | 250/214 RC |
| 3,815,994 | 6/1974 | Peckham ..................... | 356/5 |
| 3,900,261 | 8/1975 | Wingate ....................... | 356/5 |
| 4,047,023 | 9/1977 | Key et al. .................... | 250/214 B |
| 4,050,819 | 9/1977 | Lichtman ..................... | 356/5 |
| 4,068,222 | 1/1978 | Treviranus ................... | 356/5 |
| 4,140,060 | 2/1979 | Brenner ........................ | 356/5 |

FOREIGN PATENT DOCUMENTS

1237480  6/1971  United Kingdom .................. 340/26

*Primary Examiner*—John W. Caldwell, Sr.
*Assistant Examiner*—Donnie L. Crosland
*Attorney, Agent, or Firm*—Kirschstein, Kirschstein, Ottinger & Cobrin

[57] ABSTRACT

A marine obstacle avoidance system for and method of alerting a helmsman of a marine vehicle to the danger of maritime collision with floating and/or submerged objects. The system includes an optical transmitter, an optical receiver, and an alarm. The transmitter transmits an incident light beam towards the waterline, whereupon a reflected light beam and a refracted lightbeam are generated. An obstacle in the path of either the incident and/or reflected and/or refracted beams is detected by reflecting the light back towards the receiver which, in turn, sounds the alarm.

42 Claims, 9 Drawing Figures

METHOD OF AND SYSTEM FOR DETECTING MARINE OBSTACLES

BACKGROUND OF THE INVENTION

1. Field of the Invention

The present invention generally relates to a marine obstacle avoidance system and, more particularly, to a method of alerting a helmsman of a marine vehicle to the danger of maritime collision with floating and/or submerged obstacles.

2. Description of the Prior Art

The danger of maritime collisions during daylight or nighttime conditions is well documented. It is known to transmit acoustic signals by an underwater sound transmitter and to thereupon detect the reflected acoustic echo signal (i.e. sonar) for the purpose of finding underwater objects. It is also known to transmit microwave signals from an abovewater microwave transmitter and to thereupon detect the reflected microwave echo signal (i.e. radar) for the purpose of finding abovewater objects. Other than by direct visual sighting, there is no known way to detect objects floating at, slightly below or slightly above the water's surface.

As shown in U.S. Pat. Nos. 2,732,539; 3,203,305; 2,972,924; and Great Britain No. 1,237,480, optically-based collision avoidance systems have never been used on boats heretofore, and no previous shipboard system is known to me which is operative for detecting both floating and submerged objects, either simultaneously or separately.

SUMMARY OF THE INVENTION

1. Objects of the Invention

Accordingly, it is the general object of this invention to overcome the drawbacks of the prior art.

It is a further object of this invention to provide an optically-based marine collision avoidance system which is sufficiently light-in-weight, small, compact, and inexpensive to fall within the means of private owner smaller watercraft.

It is another object of this invention to reliably detect marine obstacles either simultaneously and/or separately, below, on and above the waterline.

It is still another object of this invention to give the helmsman adequate warning of an impending collision.

It is yet another object of this invention to provide a marine obstacle avoidance system which can operate during daylight or nighttime conditions.

It is an additional object of this invention to provide a marine obstacle avoidance system for one boat which does not interfere with the operation of another marine obstacle avoidance system on other boats.

It is a further object of this invention to provide a marine obstacle avoidance system which does not generate any radar interference or dangerous radiation.

It is a still further object of this invention to eliminate visible light transmission by employing infrared and ultraviolet light frequencies.

It is another object of this invention to maximize system efficiency by operating the optical receiver only at times when outgoing signals from the optical transmitter are expected to return.

2. Features of the Invention

In keeping with these objects and others which will become apparent hereinafter, one feature of the invention resides, briefly stated, in a method of, and marine obstacle avoidance system for, alerting a helmsman of a marine vehicle to the danger of maritime collision with floating and/or submerged obstacles. The system comprises a transmitter, a receiver and an alarm.

The transmitter is mounted on the marine vehicle at a location above the air-water interface, and is operative for generating light radiation with at least one wavelength in the range including the ultraviolet light region, the visible light region and the infrared light region of the light spectrum, and thereupon for transmitting the generated light radiation as an incident light beam along a path which extends generally forwardly away from the marine vehicle, as considered along the forward direction of advancement of the vehicle, and downwardly towards the water surface at a predetermined angle below the horizon. One portion of the transmitted incident light beam is reflected off the water surface to constitute a reflected light beam which extends along a path forwardly away from the marine vehicle and upwardly into the air. Another portion of the transmitted incident light beam is refracted into the water to constitute a refracted light beam which extends along a path forwardly away from the marine vehicle and downwardly into the water.

The receiver is mounted on the same marine vehicle for detecting the presence of any scattered light radiation which was initially transmitted by the transmitter and which was thereupon reflected off obstacles lying in the paths of the incident light beam and/or the reflected light beam and/or the refracted light beam.

The alarm is responsive to detection by the receiver and is operative for alerting the helmsman to the presence of a floating obstacle in the paths of the incident light beam and/or the reflected light beam, and also for alerting the helmsman to the presence of a submerged obstacle in the path of the refracted light beam.

In accordance with this invention, the helmsman is forewarned to the danger of a maritime collision of the marine vehicle with obstacles located generally forwardly of the same. The method and system of this invention can be performed by day or at night.

Another feature of the invention resides in the elimination of the visible light frequencies of the light beams, and the transmission of only the ultraviolet and infrared frequencies. This not only eliminates the problem of fog blindness, but also permits the transmitted light to penetrate the water to a considerable extent, as well as increasing the amount of reflectivity off floating obstacles. Fog blindness is also known as visual backscatter.

Still another feature is the use of a pulsating source for transmitting narrow pulses with fast rise times, and the use of a light sensor for detecting such pulses. The optical receiver is only actuated during time intervals when the returning light pulses are expected to be returned in order to maximize system efficiency.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Referring now particularly to FIGS. 1–5 of the drawings, the marine obstacle avoidance system 10 is mounted on a marine vehicle 12 for the purpose of alerting the helmsmen to the danger of maritime collision with either floating and/or submerged obstacles. Although FIGS. 1–5 depict the marine vehicle 12 as a powerboat, it will be expressly understood that this was done to simplify the drawings, and that the collision avoidance system 10 can be mounted on any type or size of water-borne vessel, ship or boat, including but not limited to motorboats, sailboats, rowboats, houseboats, yachts, catamarans, hydrofoil boats, etc.

Figure 1:
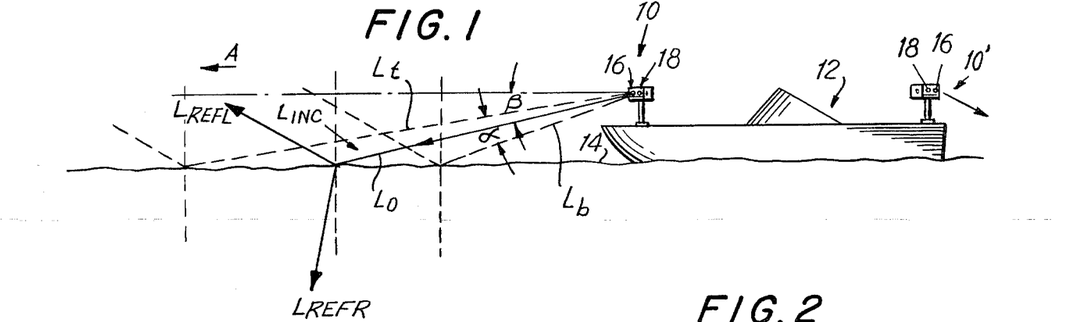
FIG. 1 is a schematic illustration of the range of the incident light beam of the marine obstacle avoidance system in accordance with the present invention.

As best shown in FIG. 1, the collision avoidance system 12 is mounted above the water line or air-water interface 14. Preferably, the system 10 is located at the fore part of the boat adjacent the bow.

The system 10 includes a transmitter means 16 operative for generating light radiation. As used in this specification, the term "light" is not restricted solely to visible light, but specifically includes all electromagnetic radiation in the wavelength range including ultraviolet (300–400 millimicrons), visible (400–700 millimicrons), and infrared (700–1500 millimicrons) light radiation. The transmitter 16 generates light radiation in the above-identified wavelength ranges, and thereupon transmits the generated light radiation as an incident light beam along a path which extends generally forwardly away from the boat 10, as considered along the direction of advancement (arrow A), and downwardly towards the waterline 14. The transmitter 16 is mounted on the boat such that no boat superstructure lies in the path of the incident beam.

Figure 2:
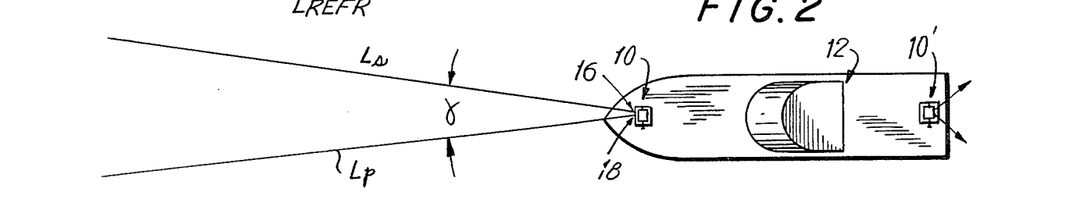
FIG. 2 is a top plan schematic view of the system of FIG. 1 showing the beam width of the incident light beam.

As diagrammatically shown in FIGS. 1 and 2, the transmitter 16 emits a generally conically-shiped incident beam $L_{INC}$. As considered in the vertical plane (FIG. 1), the incident beam has a top beam portion $L_t$, a bottom beam portion $L_b$, and a central beam portion $L_o$ which lies along the optical axis of symmetry and which is located generally centrally between the top and bottom beam portions. The vertical beam width $\alpha$ is the angular distance between the top and bottom beam portions. The transmitter 16 is pointed downwardly towards the waterline such that the optical axis defines an angle of inclination $\beta$ with the horizon.

As seen in the horizontal plane (FIG. 2), the incident beam has a port beam portion $L_p$ and a starboard beam portion $L_s$. The horizontal beam width $\gamma$ is the angular distance between the port and starboard beam portions.

As will be described in greater detail below, the transmitter 16 is adjustably mounted on the boat such that the area of the zone in which the incident light strikes the water can be controlled. Any acute angle can be selected for the inclination angle $\beta$. The particular angle chosen depends, among other things, upon the size of the boat and the location of the transmitter relative to the waterline. In a preferred embodiment for small watercraft, I have found that an inclination angle in the vicinity of 6° is preferred. Furthermore, the optics of the transmitter is dimensioned to control the size of the vertical beam width. I have found it desirable to limit the vertical beam width angle to about 10°. With such parameters, the bottom beam portion $L_b$ impinges the waterline at about 30 feet ahead of the boat (NEAR distance); the central beam portion $L_o$ impinges the waterline at about 300 feet ahead of the boat (MID distance); and the top beam portion portion $L_t$ impinges the waterline at about 600 feet ahead of the boat (FAR distance).

There is a trade-off between the magnitude of the transmitted power and the size of the horizontal beam width, and I have found it desirable for most purposes, to select $\gamma$ to be in the neighborhood of 5° in order to satisfy practical power considerations and to generate a beam whose horizontal beam width at the MID distance is wider than the boat. A horizontal beam width which is wider than the boat width at 300 feet is very satisfactory for obtaining a wide area of coverage.

All of the above-described angles and distances are merely exemplary and are not intended to be self-limiting in any way. It is obvious that other inclination angles, beam widths and distances could have been selected in dependence upon the size of the particular boat in which the system is to be employed.

The system 10 also includes a receiver means 18 likewise mounted on the same boat 12 adjacent to the transmitter 16. The receiver 18 is operative for receiving any light which has been scattered or reflected off any obstacle lying forwardly of the boat. No boat superstructure lies in front of the receiver.

As is well known, when an incident ray of light strikes the boundary surface of two different light-transmissive media, a proportion of the incident light is reflected back into the first medium. The rest penetrates into the second medium, but it undergoes a change of direction in doing so: it is refracted.

Turning back to FIG. 1, let it be assumed that the central beam portion $L_o$ completely represents an incident light ray. In other words, for ease of description, the conically-shaped incident light beam will hereafter be characterized by a single line, and not by its top, bottom, port and starboard boundary lines. Then, a proportion of the incident beam $L_o$ will be reflected from the water boundary surface such that the angle which the incident beam forms with the perpendicular of incidence (i.e. a line perpendicular to the boundary surface) is equal to the angle formed therewith by the reflected ray $L_{REFL}$. The reflected ray extends along a path forwardly away from the boat and upwardly into the air.

The remaining portion of the incident beam constitutes a refracted light beam $L_{REFR}$ which extends along a path forwardly away from the boat and downwardly into the water. The angle which the refracted ray forms with the perpendicular of incidence is determined by the index of refraction of the water.

Figure 3:
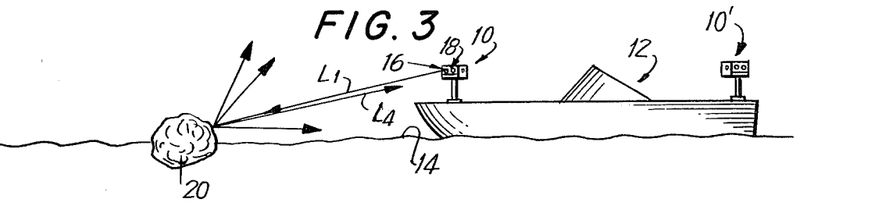
FIG. 3 is a schematic illustration of the system of FIG. 1 depicting the detection of a floating obstacle lying in the path of the incident light beam.
Figure 4:
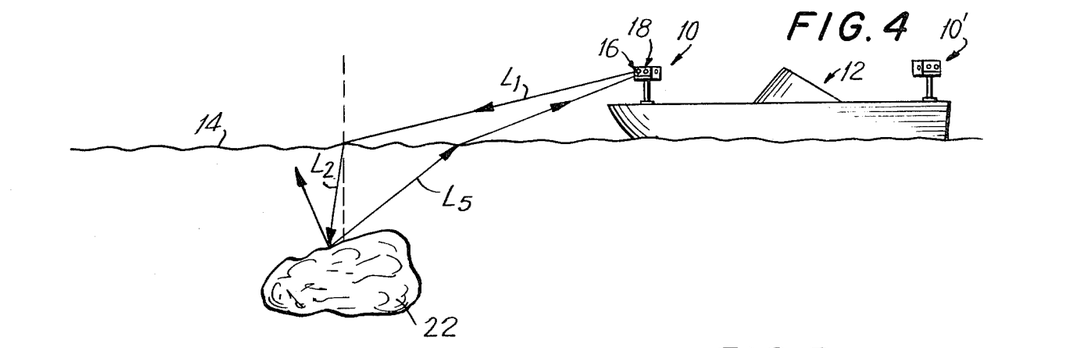
FIG. 4 is a schematic illustration of the system of FIG. 1 depicting the detection of a submerged obstacle lying in the path of the refracted light beam.
Figure 5:
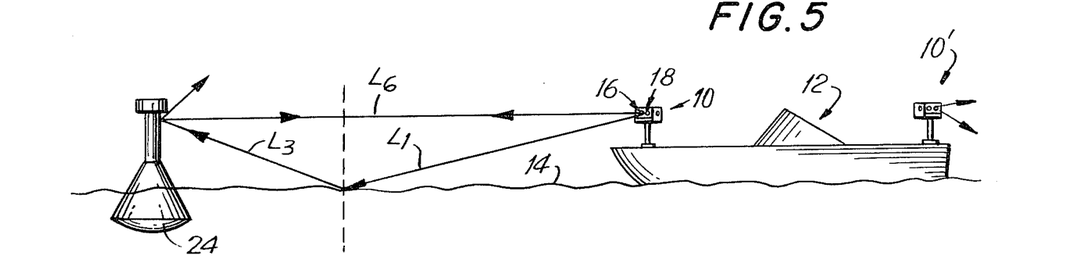
FIG. 5 is a schematic illustration of the system of FIG. 1 depicting the detection of a floating obstacle lying in the path of the reflected light beam and/or the path of the incident light beam.

The receiver 18 detects light scattered off any obstacle lying in the paths of either the incident, reflected or refracted beams. Thus, FIG. 3 depicts a floating object 20 in the path of the incident beam $L_1$. FIG. 4 depicts a submerged object 22 in the path of the refracted beam $L_2$. FIG. 5 depicts a floating object 24 in the paths of the reflected beam $L_3$ and the incident beam $L_6$. In all cases light scatters off the obstacles and is returned by return rays $L_4$, $L_5$, $L_6$ to the receiver 18. Once detected, an alarm is sounded to warn the helmsman that an obstacle lies ahead of the boat.

Figure 6:
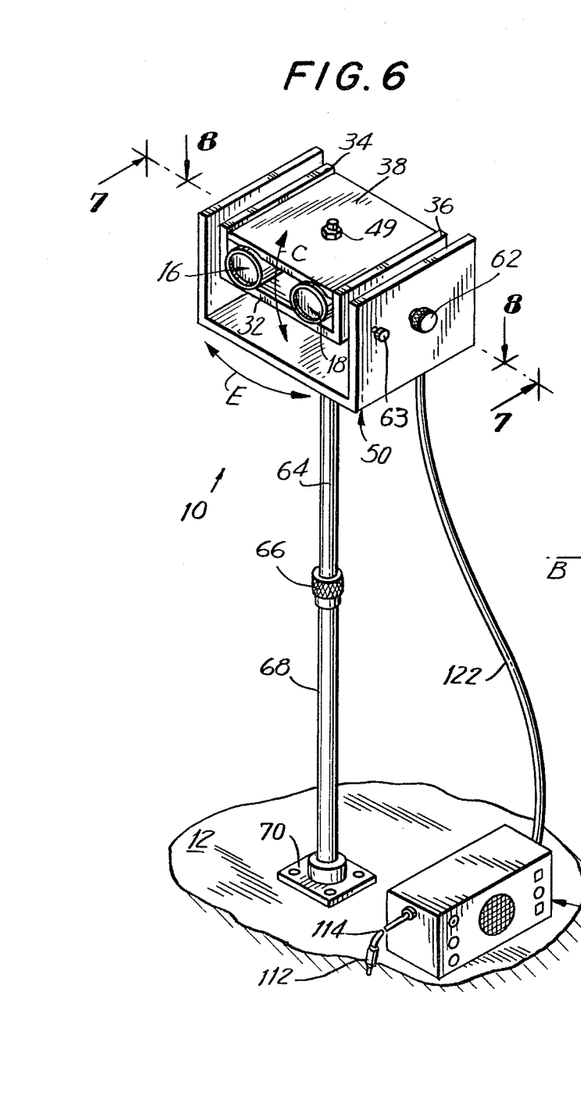
FIG. 6 is a front perspective view of a preferred embodiment of the marine obstacle avoidance system mounted on a marine vehicle, as described by a broken-away portion of a ship deck.
Figure 7:
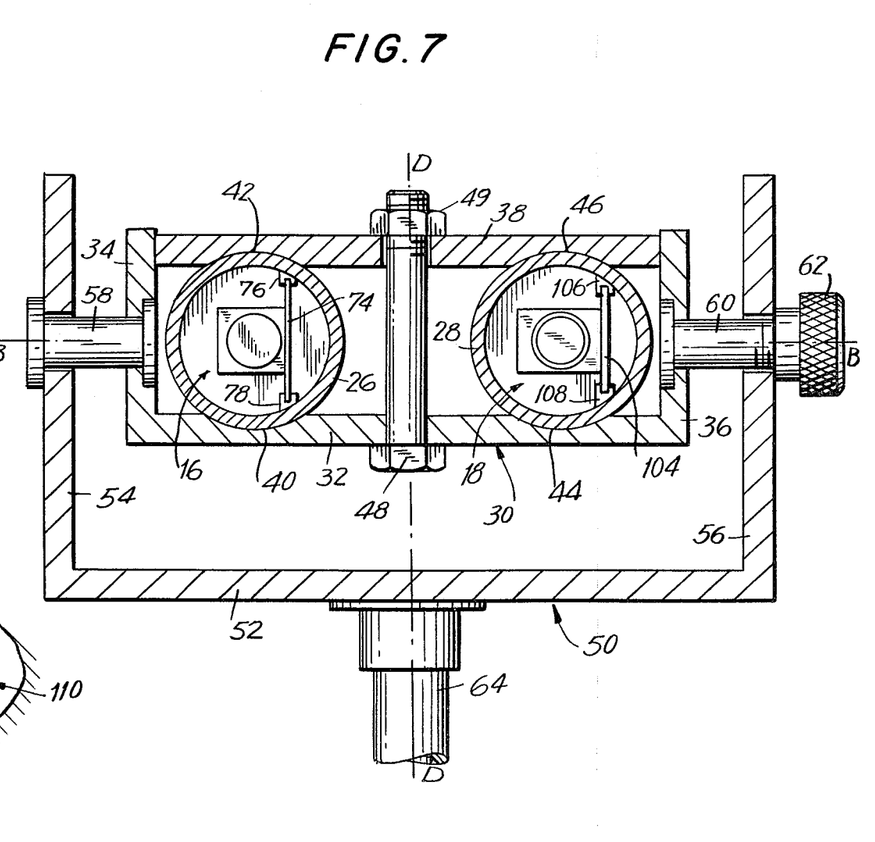
FIG. 7 is an enlarged, elevational cross-sectional view as taken on line 7—7 of FIG. 6.
Figure 8:
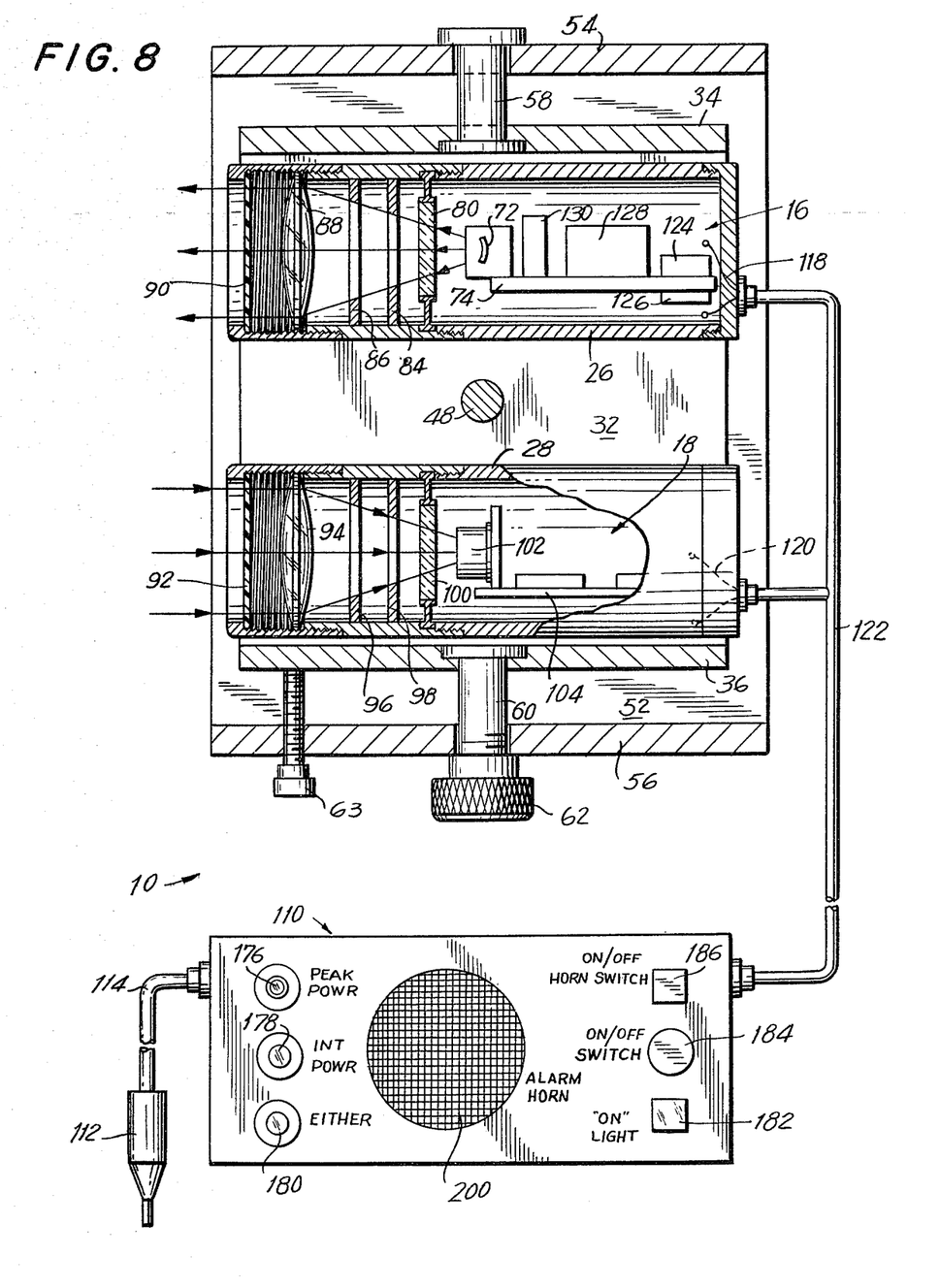
FIG. 8 is an enlarged, top plan, partially broken-away, sectional view as taken on line 8—8 of FIG. 6.

FIGS. 6, 7 and 8 illustrate a preferred embodiment of the system 10. The transmitter 16 includes a cylindrical transmitter housing 26, and the receiver 18 includes a cylindrical receiver housing 28. The housings 26, 28 are optically and mechanically boresighted with each other by being mounted in mutual parallelism. A U-shaped mounting member 30 has a base portion 32 and a pair of opposite side wall portions 34, 36. A cover plate 38 is juxtaposed over the base portion 32 and closes the open end of the mounting member 30. A pair of shallow concave recesses 40, 44 are formed in side-by-side relationship in the base portion 32, and another pair of shallow concave recesses 42, 46 are formed in side-by-side relationship in the cover plate 38. Recesses 40, 42 are mirror images of each other and receive opposite cylindrical portions of the transmitter housing 26. In similar fashion, recesses 44, 46 receive opposite cylindrical portions of the receiver housing 28. Clamping bolt 48 passes through the base portion 32 and through the cover plate 38, and threadedly engages clamping nut 49 in order to fix the position of housings 26, 28 relative to each other such that each housing is elongated in a mutually parallel direction.

A U-shaped cradle 50 has a base portion 52 and a pair of opposite side wall portions 54, 56. The base portion 52 underlies the base portion 32 of the mounting member 30, and the side wall portions 54, 56 are exteriorly located relative to the side wall portions 34, 36. The transmitter-receiver assembly overlies the open upper end of the cradle 50 and is mounted on the latter for pivoting movement relative thereto about the horizontal axis B—B. Co-linear journals 58, 60 are connected to the side wall portions 34, 36 and are mounted for turning movement on the side wall portions 54, 56 of the cradle 50. A manually-turnable handle 62 is operatively connected to the journal 60 in turn the transmitter-receiver assembly about axis B—B. A stop 63 (FIGS. 6, 8) is mounted in side wall 56 for continuous adjustable movement relative thereto. When the leading end of stop 63 is brought into affirmative engagement with the side wall 36, then tilting movement in the up-and-down direction of the double-headed arrow C is prevented. Tilting of the transmitter-receiver assembly by turning the knob 62 permits the helmsman to change the angle of inclination described above.

The transmitter-receiver assembly can likewise be turned about the vertical axis D—D so that the helmsmen can turn the assembly from side-to-side in direction of the double-headed arrow E to detect whether any obstacles are located at the port and/or at the starboard side of the boat. This is obtained by mounting the cradle 50 on an upright movable support 64 which is turnably mounted at joint 66 to the upright stationary support 68. Bracket 70 supports the lower end of support 68 to the deck of the boat 12.

As best shown in FIG. 8, a light radiation source 72 is mounted on a circuit board 74 which, in turn, is securely mounted within housing 26 by support mounts 76, 78 (See FIG. 7). The source 72 is a multi-spectral source capable of emitting radiation in all wavelengths in the range from about 300 millimicrons to about 1100 millimicrons. The light source preferably can be pulsed on and off at high frequencies on the order of 4–10 pulses per second, with each pulse having a time period of about one millionth of a second. It have found that a Xenon flash tube satisfies these multi-spectral and pulse duration requirements. Of course, other suitable light sources such as lasers could likewise be employed.

Although obstacles can be detected with all frequencies in the ultraviolet, visible and infrared ranges, I have found it desirable to optically modify the emitted light by using an optical filter 80 of glass or plastic material. The filter 80 absorbs the visible light and permits only the infrared and ultraviolet frequencies to pass therethrough. The elimination of visible light prevents fog "blindness" caused by the scattering interaction of visible light with water droplets, particularly when one is using the collision avoidance system at night and in wet weather. This feature not only prevents the helmsman from being blinded by the light of his own transmitted light ray, but also protects other helmsman of other boats from being blinded by the same ray.

The ultraviolet light frequencies are characterized in that they penetrate the water to a much greater extent as compared to infrared frequencies. This is particularly desirable for detecting any submerged obstacles. On the other hand, the infrared light frequencies are characterized in that they penetrate through haze and reflect off an object to a much greater extent as compared to ultraviolet frequencies. This is particularly desirable for detecting floating objects.

The best trade-off between maximum water penetration and maximum reflectivity off an object is a light wavelength of about 475 millimicrons; however, this wavelength lies in the visible region. In order to eliminate the problem of fog blindness and yet retain the dual advantages of maximum water penetration and reflectivity, the transmitter emits both ultraviolet and infrared frequencies simultaneously. Although the invention could be practiced by transmitting a single frequency in the ultraviolet range and a single frequency in the infrared range, it is preferable to send out a band of frequencies in both ranges in order to transmit more average power out, and thereby receive a greater percentage of returned power.

A series of light baffles 84, 86 are positioned forwardly of the source 72 to shape the size and direction of the outgoing beam. The baffles have circular apertures whose diameters gradually increase in size in the direction of the outgoing beam.

A collimating lens 88, preferably a fresnel lens of light-weight glass or plastic, is positioned forwardly of the baffles, and is operative to convert the outwardly diverging light rays of the emitted beam to a set of mutually parallel light rays which theoretically intersect each other at infinity. Practically, the lens 88 is selected with an f number of about 0.6 and focuses all the emitted light frequencies about 300 feet or so in front of the boat with minimum color aberration.

A light-transmissive window 90 is located forwardly of the lens 88 and serves as a weather-resistant protective barrier to protect the internal components of the transmitter from the everpresent deleterious environmental conditions such as salt and moisture.

Before describing the structure and function of the pulse trigger and power control circuitry which control the operation of the light source 72, the detection of the light reflected off an obstacle will now be discussed. Due to the optical boresighting of the receiver 18, the returning light enters the receiver through the light-transmissive window 92 which is essentially identical in structure and function to the window 90. Thereupon, the mutually parallel light rays are focused to a set of converging light rays by collimating lens 94 which is essentially identical to lens 88. A set of light baffles 94, 96 similar to baffles 86, 84 serve to reduce the cross-section of the returning rays and also to assist in screening out ambient light. Color filter 100 is likewise similar to filter 80 and only permits ultraviolet and infrared rays to pass therethrough towards the light-sensing means 102.

The light-sensing means 102 may be any photo-sensing device such as a photodiode or a photomultiplier tube. Preferably, the light sensor 102 can respond quickly enough to detect the narrow pulse widths of the rapidly pulsing light source 72.

The light sensor 102 is mounted on circuit board 104 which, in turn, is securely mounted by support mounts 106, 108 (see FIG. 7) within receiver housing 28. The control and processing circuitry for the light sensor 102 is likewise mounted on circuit board 104.

The system 10 still further includes alarm means or annunciator 110 responsive to the detection of scattered returning light beams, and operative for alerting the helmsman to the presence of an obstacle ahead of the boat. The obstacle may be floating on the water such as another boat, or a buoy, or a floating log, or any other type of flotsam and jetsam; or the obstacle may be submerged such as submerged rocks, or sandbars, or coral reefs; or the obstacle may be raised above the water such as a hydrofoil boat, or for that matter, a low standing pier or a low flying plane. Any obstacle that may jeopardize the safety of the boat and its passengers will be detected provided it lies in the path of at least one, and in cases where there are multiple obstacles, more than one of the light beams. If the obstacle does not intercept the light beam, the boat will pass it by safely.

Figure 9:
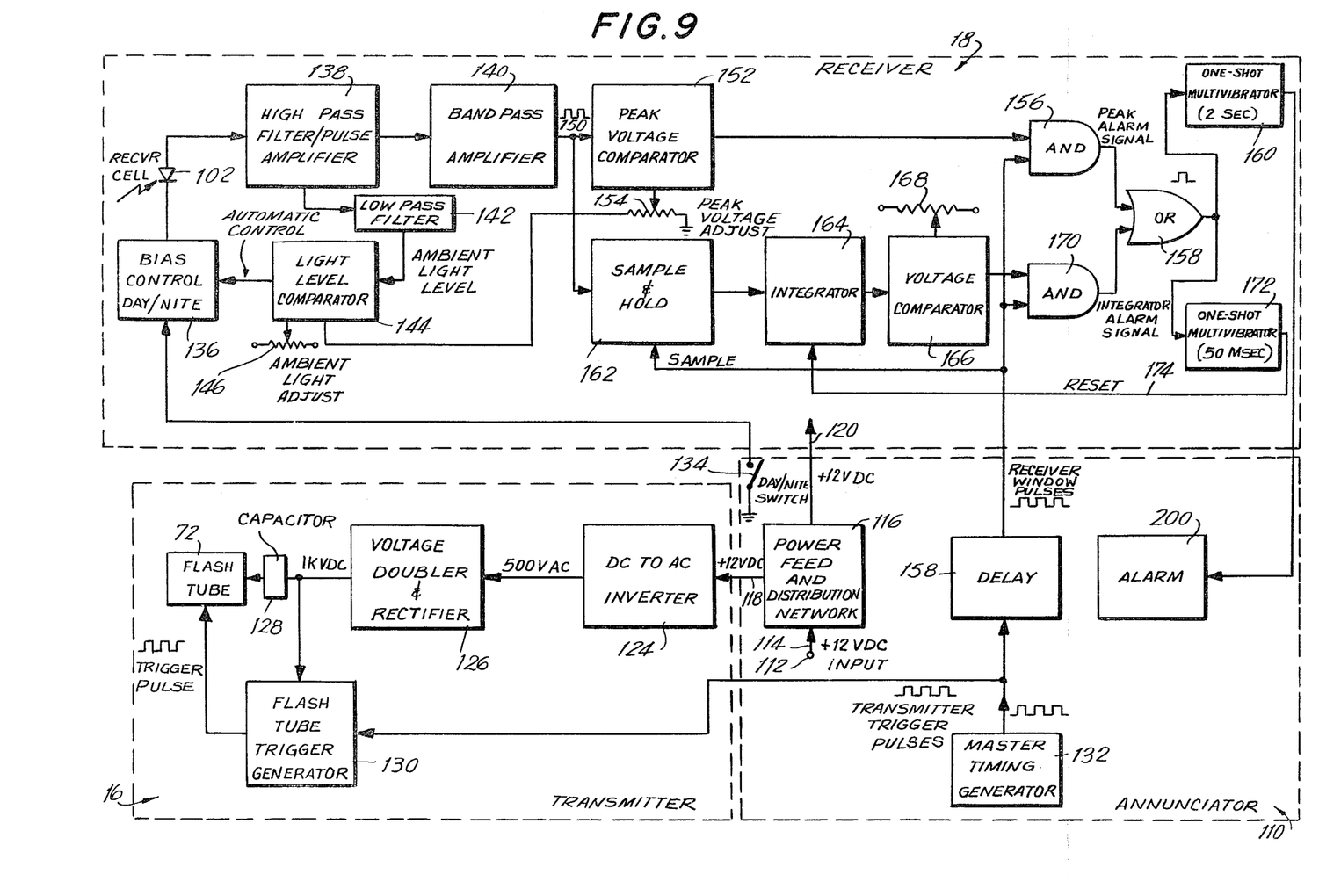
FIG. 9 is an electrical circuit schematic diagram showing the operation of a preferred embodiment of the marine system in accordance with the present invention.

FIG. 9 schematically illustrates the control electronics for the transmitter 16, the receiver 18, and the annunciator 110. The boat battery constitutes a convenient +12 v DC power source, and the system 10 is designed to operate from this power supply. A convenient electrical connection to the battery can be obtained via a cigarette lighter plug 112 (FIG. 8) which is inserted into a standard cigarette lighter receptacle which is commonly provided on boats. The DC power is conducted by power cable 114 from the plug 112 to the annunciator 110, whereupon the power feed and distribution network 116 conducts the +12 v DC both to the transmitter 16 and the receiver 18 by separate conductors 118, 120 located in cable 122.

As best shown in FIG. 9, the +12 v DC is fed to a DC-to-AC inverter 124 operative for converting the +12 v DC to about 500 v AC. Thereupon, the 500 v AC is supplied to a voltage doubler and rectifier 126 operative for converting the 500 v AC to about 1 kv DC. This stepped-up voltage is fed to a quick-charging capacitor 128 which in turn supplies the high DC voltage to the arc electrodes of the Xenon flash tube 72 for causing the latter to emit light.

A master timing generator 132 in the annunciator 110 generates a pulse train to transmitter trigger pulses each of rectangular configuration. As noted above, the generator 132 produces pulses of short duration. In a preferred embodiment, eight pulses a second are generated, and ten microsecond time periods are generated for each pulse. The transmitter trigger pulses are electrically conducted by a conductor in cable 122 to a flash tube trigger generator circuit 130 in the transmitter. The trigger generator circuit 130 rapidly discharges the capacitor 128 for each successive trigger pulse, and causes the flash tube electrodes to alternately be charged and discharged, thereby pulsing the flash tube at the repetition rate or frequency of the trigger pulses. As will be explained in detail below, the master timing generator 132 also is electrically connected to the receiver control circuitry so that the latter processes the returning rays only at predetermined time intervals which are timed to the trigger pulses.

As best shown in FIG. 8, the transmitter electrical components 124, 126, 128, 130 and 72 are mounted within the transmitter housing 26, and preferably on the circuit board 74. Electrical connections in FIG. 8 have been omitted for the sake of clarity.

Turning now to the receiver 18, the light sensor 102 is preferably a photodiode or receiver cell 102. The photodiode 102 converts incident light energy to an electrical signal. The photodiode can be operated in either the photo-voltaic or the photoconductive mode in dependence upon the operation of the day/nite sub-circuit which includes the day/nite switch 134 and the day/nite bias control circuit 136. The switch 134 is preferably, but not necessarily, mounted on the annunciator 110, and can be a manually-operable or a light-sensitive switch. In either case, the switch has a day position and a night position. During daylight conditions, the bias control circuit 136 biases the photodiode into the photo-conductive mode in order to make the photodiode less sensitive to ambient radiation such as sunlight. During nightlike conditions, the bias circuit 136 biases the photodiode into the photo-voltaic mode in order to make the photodiode more sensitive to small target detection.

In either mode of operation, the photodiode receives ambient or non-signal light from such sources as direct sunlight, relected sunlight, moonlight, or other lights such as spotlights. The photodiode also receives signal light, i.e. the returning light rays which have been reflected off an obstacle in the boat's path.

The high pass filter/pulse amplifier 138 and the bandpass amplifier 140 are operative to discriminate between non-signal and signal light by amplifying the latter and greatly attenuating the former. From the ambient light, the photodiode generates in theory a DC signal of constant magnitude. In practice, the roll, pitch and yaw movement of the boat on the waves as well as the propulsion of the boat itself, causes the photodiode to generate a slowly varying DC signal at the output of pulse amplifier 138. The bandpass amplifier 140 has a non-illustrated DC blocking capacitor at its input end to block out any DC signals. The bandpass filter has a lower cutoff frequency selected to attenuate any low frequency signals such as the aforementioned slowly varying ambient light signal, and has a higher cutoff frequency selected to attenuate any high frequency signals such as noise generated by the photodiode. A pulse train of signal light pulses, which correspond to the pulses that were previously transmitted by the pulsing flash tube 72, is fed to output terminal 150 for subsequent processing.

An auxiliary bias control circuit for adjusting the bias on the photodiode as a function of the ambient light conditions is also shown. The auxiliary circuit includes a low pass filter 142 at the output of pulse amplifier 138 and operative to permit only the slowly varying DC signal to pass therethrough. Thus, the output signal of the filter 142 is continuously indicative of the ambient light level. This output signal is fed to a light level comparator 144 which continuously compares the magnitude of the ambient light signal with a fixed predetermined light magnitude which has been pre-set by the ambient light adjusting potentiometer 146. The output automatic control signal of the comparator 144 is then fed to the bias control circuit 136 in order to automatically adjust the bias on the photodiode. The auxiliary bias circuit components 142, 144, 146 can be used as a supplement to, or as a substitute for, the day/nite switch 134. The comparator 144 can be designed such that the output automatic control signal is digital or analog in nature. Thus, the photodiode bias can be adjusted continuously or in small discrete steps.

The amplified return pulse signals at output terminal 150 is processed to activate the alarm 200 as follows: The return pulse signals are fed to a peak voltage comparator 152 operative for successively comparing the peak magnitude of each incoming return pulse signal with a fixed predetermined threshold voltage level which has been pre-set by the peak voltage adjust potentiometer 154. The threshold voltage level is selected such that an obstacle of a certain size and at a certain distance from the boat can be detected. I have chosen as my standard for small craft that a black body about one square foot in size and located about 300 feet from the boat is sufficiently dangerous to necessitate sounding a collision alarm. Hence, the threshold level, i.e. sensitivity, is pre-adjusted to detect such an obstacle. In a preferred embodiment, the adjustment of the threshold level in comparator 152 is made simultaneously with the adjustment of the threshold level in comparator 144.

If the peak voltage of an incoming return pulse is greater than the threshold level in comparator 152, then the comparator output will go to a logic "1" state from a quiescent logic "0" state. If the peak voltage of the incoming pulse is less than the threshold level, then the comparator output will remain at the logic "0" state. The comparator output is fed to one input of an AND logic gate 156.

The other input of the AND gate 156 is fed with a pulse train of receiver window pulses each of rectangular configuration. As noted above, the master timing generator 132 generates a series of transmitter trigger pulses, and these trigger pulses are fed into a time delay circuit 158 to thereby generate the receiver window pulses. Light travels at approximately the speed of 1 foot per nanosecond, and therefore about 600 nanoseconds would elapse for light to strike an object about 300 feet away from the boat, and then return. The time delay circuit 158 is thus operative for modifying the transmitter trigger pulses by delaying them by a predetermined time period (e.g. 600 nanoseconds) to thereby generate the receiver window pulses.

If the comparator output goes to a logic "1" state, (indicating that a dangerous obstacle is ahead), and if this occurs when the corresponding receiver window pulse is also at a logic "1" state, then the AND gate 156 also goes to a logic "1" state and generates a peak alarm signal. In effect, the time delay circuit 158 controls the receiver processing circuitry and only permits the latter to generate an alarm signal when the receiver should be expecting a return reflection signal. Thus, the receiver is not "looking" for a return signal all the time, but only at a time when one would expect the signal to return.

If the time delay circuit 158 were omitted, there would not be any overlap between the transmitted and the return pulses. This presence of the time delay circuit maximizes the efficiency of the system.

It will be appreciated that the larger the vessel on which the system 10 is mounted, the more important the time delay circuit becomes. Thus, where the transmitter is emitting light over distances on the order of 5000 feet or more ahead of the vessel, then it becomes increasingly more important in terms of system efficiency to introduce the appropriate time delay.

The peak alarm signal at the output of the AND gate 156 is thereupon fed to one input of an OR logic gate 158 which, in turn, feeds the pulsed signal to the one-shot multivibrator 160. The monostable multivibrator 160 preferably has a time constant of about 2 seconds. Once triggered by the pulsed signal from the OR gate 158, the multivibrator 160 conducts an output alarm signal to the alarm 200 by means of an electrical conductor in the cable 122. The alarm 200 may be of the visually-indicating type such as a light and/or of the auditory-indicating type such as a buzzer. As shown in FIG. 8, the alarm 200 is a speaker horn.

Simultaneously with the peak voltage comparison detection described above, the return pulse signals at output terminal 150 is conducted to a sample and hold circuit 162 which is operative for storing the instantaneous magnitudes of the successive pulses of the output signal at 150. The receiver window pulses are also fed to the sample and hold circuit 162 in order to actuate the latter only at those times when one would expect the return light beams to be detected by the photodiode.

As noted above, when the magnitude of a single pulse is greater than the threshold magnitude in the peak comparator 152, then the alarm 200 is sounded. However, when the magnitude of one pulse is not greater than the threshold magnitude, then this information would otherwise be lost if the system 10 relied only on the peak comparator 152. However, this latter information is useful because it indicates that some object of some size and at some distant location is located ahead of the boat. It would be very desirable to inform the helmsman of this impending collision in advance of the operation of the peak comparator. Hence, the sample and hold circuit receives each pulse and holds the voltage constant until the next pulse is received at which time the new signal amplitude is stored.

The sampled output signal plus any random noise is fed to an integrator 164. The integrator time averages the random noise component to a mean value approaching zero. The sampled output signal component causes the output of the integrator to increase in voltage each time another pulse is received at a rate proportional to the amplitude of the successively received pulses. The output voltage of the integrator is compared to the voltage threshold level set by a potentiometer 168 of a voltage comparator 166. If the integrator output voltage exceeds the threshold level of comparator 166, then the integrator output voltage signal is fed to an input of an AND logic gate 170. The other input of AND gate 170 receives the receiver window pulses so that an integrator alarm signal is generated at the output of AND gate 170 only when one expects the return light beams to be detected by the photodiode.

The integrator alarm signal is thereupon fed to the other input of the OR gate 158, whereupon it is fed to the monostable multivibrator 160 and thereupon to the alarm 200 in the same manner as described above for the peak alarm signal. Thus, the alarm not only sounds when a single strong pulse is detected by the peak voltage comparator 152, but also sounds after a series of weak pulses has been detected by the comparator 166.

It is necessary to reset the integrator 164 every time the integrator alarm signal is generated. Hence, the integrator alarm signal is fed to another one-shot monostable multivibrator 172 which has a built-in time constant preferably on the order of 50 milliseconds. The multivibrator 172 generates a reset pulse and conducts it along reset line 174 to the integrator to clear the register and begin the integration from zero.

The return pulse processing circuit components 152–174 are preferably all mounted within the receiver housing 28 on the circuit board 104, although at least some of these components could be moved to within the annunciator housing. The electrical interconnections of the receiver components have been omitted in FIG. 8 for the sake of clarity.

As is best shown in FIG. 8, the control panel on the annunciator 110 has warning lights 176, 178, 180 mounted thereon. Light 176 indicates that the peak alarm signal has been generated. Light 178 indicates that the integrator alarm signal has been generated. Light 180 indicates that both the peak and the integrator alarm signals have been generated.

The ON light 182 indicates that the system is operational. The ON/OFF switch 184 actuates or deactuates the system 10. The ON/OFF horn switch 186 provides a test check to determine whether the horn 200 is working. In use, actuation of the horn switch at any time by a user verifies that the horn is operational.

Briefly recapitulating the system operation, the flash tube 72 transmits light pulses which reflect off the waterline into the air and which refract into the water. If there are no obstacles ahead of the boat, then there will be no return light beams. The sensitivity of the transmitter is adjusted such that obstacles which do not pose a safety hazard, such as high flying planes or the seabed, are not detected. If one or more obstacles lie in the path of the incident, reflected or refracted beams, then the photodiode 102 will detect the return light pulses which reflect off the obstacle. An alarm is sounded in adequate time to alert the helmsman to stop the boat, or perhaps steer around the obstacle.

The system can be operated by day or at night. The ultraviolet frequencies penetrate the water more effectively than the infrared frequencies. The infrared frequencies are more efficient in detecting objects at or above the waterline.

The visible light frequencies can be eliminated, thereby providing an "invisible" search beacon. If it is not desired to eliminate the visible light frequencies, then the optical filters 80,100 can be easily removed from the housing 26, 28 due to the multi-part construction of the latter.

The Xenon flash tube has the capability of being pulsed on and off rapidly with a narrow pulse width, as well as radiating light through large solid angles which permit wide scanning beam patterns. The photodiode and processing circuitry has the corresponding capability of having a very fast rise time characteristic. The receiver responds only to light pulses that come from its own transmitter because the receiver is turned on only at those times when a return signal would be expected. The receiver does not respond to light pulses from other sources.

Due to the fixed mounting of the system 10 on the boat, the system 10 participates in its roll, pitch and yaw movements, as well as its propulsion movements. This means that although the transmitter has no moving parts, the emitted beam nevertheless scans the region around the boat. Of course, if more controlled scanning is required, then the transmitter-receiver assembly can be moved by a scanning mechanism.

In order to protect the photodiode from direct exposure to sunlight which may damage the photodiode in case of prolonged exposure, another feature of the invention resides in a mechanical shutter located in front of the photodiode. The shutter can be raised or lowered as desired.

As noted above in FIG. 6, the transmitter-receiver assembly can be rotated about the vertical axis D—D in either direction of the double-headed arrow E to detect obstacles at the port and/or at the starboard side of the boat. If desired, the transmitter-receiver assembly can be completely turned in either direction through an arc length of 360°. Hence, it is also possible for the transmitter-receiver assembly to detect obstacles at the stern of the boat provided, of course, that there is no boat superstructure rearwardly of the transmitter-receiver assembly which would lie in the light path.

In accordance with yet another feature of the invention, a plurality of additional transmitter-receiver assemblies 10′ (see FIGS. 1–5) could be mounted on the boat. One assembly could be mounted adjacent the bow, another at the port side, still another at the starboard side, and yet another at the stern. This multiple assembly arrangement is particularly well suited for large boats, and for that matter any size boat where there is a lot of superstructure which might otherwise interfere with the light beam transmitted by a single assembly. The additional assemblies 10′ may be provided with their own annunciator, or preferably all the assemblies are connected to a single annunciator. Hence, the multiple assembly arrangement can warn of an impending collision from either the front, rear or opposite sides of the boat.

It will be understood that each of the elements described above, or two or more together, may also find a useful application in other types of constructions differing from the types described above.

While the invention has been illustrated and described as embodied in a method of and system for detecting marine obstacles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A marine obstacle avoidance system for alerting a helmsman of a marine vehicle to the danger of maritime collision with floating and/or submerged obstacles, comprising:
   (a) transmitter means mounted on the marine vehicle at a location above the air-water interface, for generating light radiation with at least one wavelength in the range including the ultraviolet light region, the visible light region and the infrared light region of the light spectrum, and thereupon for transmitting the generated light radiation as an incident light beam along a path which extends generally forwardly away from the marine vehicle, as considered along the forward direction of advancement of the vehicle, and downwardly towards the water surface at a predetermined angle below the horizon,
      (1) one portion of the transmitted incident light beam being reflected off the water surface to constitute a reflected light beam which extends along a path only forwardly away from the marine vehicle and upwardly into the air, and
      (2) another portion of the transmitted incident light beam being refracted into the water to constitute a refracted light beam which extends along a path only forwardly away from the marine vehicle and downwardly into the water,
   said incident, reflected and refracted light beams being redirected in direction towards the marine vehicle when obstacles are located in their respective paths, and not being redirected towards the marine vehicle when obstacles are not located in their respective paths;
   (b) receiver means mounted on the same marine vehicle for detecting the presence of any redirected light radiation which was initially transmitted by the transmitter means and which was thereupon reflected off obstacles lying in the paths of the incident light beam and/or the reflected lightbeam and/or the refracted light beam, and for also detecting the non-return of the incident, reflected and refracted light beams when no obstacles are located in their respective paths; and
   (c) alarm means responsive to detection by the receiver means for alerting the helmsman to the presence of a floating obstacle in the paths of the incident light beam and/or the reflected light beam, and also for alerting the helmsman to the presence of a submerged obstacle in the path of the refracted light beam, whereby the helmsman is forewarned to the danger of a maritime collision of the marine vehicle with obstacles located generally forwardly of the same.

2. The marine system as defined in claim 1, wherein said transmitter means includes a multi-spectral light source; and light-modifying means for attenuating the visible light frequencies emitted by the source, and for transmitting only the ultraviolet and infrared frequencies thereof.

3. The marine system as defined in claim 2, wherein said light-modifying means includes filter means for transmitting a selected band of ultraviolet and infrared frequencies.

4. The marine system as defined in claim 1, wherein said transmitter means includes a modulatable light source; and means for rapidly pulsing the source on and off to thereby transmit a plurality of outgoing light pulses.

5. The marine system as defined in claim 4, wherein said pulsing means includes means for generating a plurality of transmitter trigger pulses, each having two operational states; means responsive to one state of each pulse for energizing the light source to emit light; and means responsive to the other state of each pulse for de-energizing the light source to stop emitting light.

6. The marine system as defined in claim 5, wherein said light source is a flash tube; and wherein said energizing means includes a storage capacitor operatively connected with the flash tube, and means responsive to said one state of each pulse for charging the capacitor to a voltage level sufficient to light the flash tube; and wherein said de-energizing means includes means responsive to said other state of each pulse for discharging the capacitor to a voltage level sufficient to extinguish the flash tube.

7. The marine system as defined in claim 1, wherein said transmitter means includes a Xenon flash tube light source.

8. The marine system as defined in claim 1, wherein said transmitter means includes a light source operative for emitting light rays which diverge outwardly and forwardly therefrom, and collimating means for optically modifying the outwardly diverging light rays to a set of generally parallel light rays.

9. The marine system as defined in claim 8, wherein said transmitter means also includes baffle means located between said light source and said collimating means, for shaping the cross-sectional dimension of the outwardly diverging rays.

10. The marine system as defined in claim 8, wherein said transmitter means also includes means for protecting the light source from deleterious environmental conditions.

11. The marine system as defined in claim 1, wherein said transmitter means is optically boresighted with said receiver means and is mounted above the air-water interface.

12. The marine system as defined in claim 1, wherein said receiver means includes a photodiode, first means for biasing the photodiode into the photo-conductive mode, second means for biasing the photodiode into the photo-voltaic mode, and means responsive to ambient light intensity for selecting one of said first and said second biasing means.

13. The marine system as defined in claim 1, wherein said receiver means includes a light sensor operative for receiving the returning light rays reflected off the obstacles, and means for focussing the returning light rays towards the sensor.

14. The marine system as defined in claim 13, wherein said receiver means means includes baffle means located between the light sensor and the focussing means, for shaping the cross-sectional dimension of the returning light rays.

15. The marine system as defined in claim 13, wherein said receiver means also includes means for protecting the light sensor from deleterious environmental conditions.

16. The marine system as defined in claim 13, wherein said receiver means includes light-modifying means for attenuating the visible light frequencies emitted by said transmitter means, and for transmitting only the ultraviolet and infrared frequencies towards the light sensor.

17. The marine system as defined in claim 1; and further comprising means for adjustably mounting said transmitter means and said receiver means for joint tilting movement in the up-and-down direction to thereby set the size of said predetermined angle; and locking means for fixing the position of said transmitter means and said receiver means.

18. The marine system as defined in claim 1; and further comprising means for adjustably mounting said transmitter means and said receiver means for joint sweeping movement about a generally vertical axis to thereby detect obstacles on the port and on the starboard sides of the marine vehicle.

19. The marine system as defined in claim 1, wherein said incident light beam is generally conically-shaped and has an acute vertical beam width angle and an acute horizontal beam width angle.

20. The marine system as defined in claim 1, wherein said receiver means generates an ambient electrical signal derived from ambient light conditions, and a return electrical signal derived from the scattered light radiation reflected off the obstacles; and further comprising means for electronically discriminating between the ambient signal and the return signal.

21. The marine system as defined in claim 20, wherein said receiver means includes a light sensor operable in two modes; and further comprising means responsive to the intensity of said ambient light conditions for selecting the one of the two modes for the light sensor.

22. The marine system as defined in claim 20, wherein said alarm means includes signal processing means responsive to said return signal for generating an alarm signal, and indicator means responsive to said alarm signal for alerting the helmsman.

23. The marine system as defined in claim 22, wherein said signal processing means includes means for comparing the voltage of the return signal with a predetermined threshold voltage level, and for generating a peak alarm signal when the return signal voltage exceeds the threshold voltage.

24. The marine system as defined in claim 22, wherein said return signal constitutes a series of pulses; and wherein said signal processing means includes means for storing the voltage of each successive pulse, integrator means for summing the voltages of the pulses, and means for comparing the summed voltages with a predetermined threshold voltage level independent of said return signal, and for generating an integrator alarm signal when the magnitude of the summed voltages exceeds the threshold voltage.

25. The marine system as defined in claim 24; and further comprising means for resetting the integrator means each time the integrator or the peak alarm signal is generated.

26. The marine system as defined in claim 1; and further comprising means for modulating the transmitter means to thereby transmit incident light beam pulses; and means for actuating the receiver means only during time intervals when the returning light beam pulses are expected to be received.

27. The marine system as defined in claim 26, wherein said actuating means includes a time delay circuit operatively connected between said transmitter means and said receiver means.

28. The marine system as defined in claim 22, wherein said indicator means includes an auditory-indicating device.

29. The marine system as defined in claim 1, and further comprising an additional transmitter means and a receiver means mounted on the same marine vehicle at a location spaced from the first-mentioned transmitter means and receiver means.

30. A method of alerting a helmsman of a marine vehicle to the danger of maritime collisions with floating and/or submerged obstacles, comprising the steps of:
(a) generating light radiation with at least one wavelength in the range including the ultraviolet light region, the visible light region and the infrared light region of the light spectrum, and thereupon transmitting the generated light radiation as an incident light beam along a path which extends generally forwardly away from the marine vehicle, as considered along the forward direction of advancement at the vehicle, and downwardly towards the water surface at a predetermined angle below the horizon,
 (1) one portion of the transmitted incident light beam being reflected off the water surface to constitute a reflected light beam which extends along a path only forwardly away from the marine vehicle and upwardly into the air, and
 (2) another portion of the transmitted incident light beam being refracted into the water to constitute a refracted light beam which extends along a path only forwardly away from the marine vehicle and downwardly into the water,
said incident, reflected and refracted light beams being redirected in direction towards the marine vehicle when obstacles are located in their respective paths, and not being redirected towards the marine vehicle when obstacles are not located in their respective paths;
(b) detecting the presence of any redirected light radiation which was initially transmitted and which was thereupon reflected off obstacles lying in the paths of the incident light beam and/or reflected light beam and/or the refracted light beam, and for also detecting the non-return of the incident, reflected and refracted light beams when no obstacles are located in their respective paths; and
(c) alerting, in response to said detection, the helmsman to the presence of a floating obstacle in the paths of the incident light beam and/or the reflected light beam, and also for alerting the helmsman to the presence of a submerged obstacle in the path of the refracted light beam, whereby the helmsman is forewarned to the danger of a maritime collision of the marine vehicle with obstacles located generally forwardly of the same.

31. The method of claim 30, wherein said transmitting step and said detecting step include attenuating the visible light frequencies, and permitting only the ultraviolet and infrared frequencies of the light spectrum to be transmitted and detected.

32. The method of claim 30; and further comprising the step of rapidly pulsing the generated light radiation to thereby transmit a plurality of outgoing light pulses.

33. The method of claim 32, and further comprising the steps of generating a plurality of transmitter trigger pulses each having two operational states, emitting light in response to one state of each pulse, and blocking light transmission in response to the other state of each pulse.

34. The method of claim 30; and further comprising the step of tilting the incident light beam in the up-and-down direction to thereby change the size of said predetermined angle.

35. The method of claim 30; wherein the marine vehicle has a port side and a starboard side; and further comprising the step of turning the incident light beam to the port and starboard sides of the marine vehicle.

36. The method of claim 30, wherein said detecting step includes generating an ambient electrical signal from ambient light conditions, and generating a return electrical signal from the scattered light radiation reflected off the obstacles; and the step of electronically discriminating between the ambient signal and the return signal.

37. The method of claim 36, wherein said detecting step is conducted in a day mode and in a night mode; and further comprising the step of selecting in response to the intensity of the ambient light conditions the operational mode in which the detection will take place.

38. The method of claim 36, wherein said alerting step includes generating an alarm signal in response to said return signal, and alarming the helmsman in response to said alarm signal.

39. The method of claim 38, wherein said alerting step includes comparing the voltage of the return signal with a predetermined threshold voltage level independent of said return signal, and generating a peak alarm signal when the return signal voltage exceeds the threshold voltage.

40. The method of claim 38, wherein said return signal constitutes a series of pulses; and wherein said alerting step includes storing the voltage of each successive pulse, summing the voltages of the pulses, comparing the summed voltages with a predetermined threshold voltage level, and generating an integrator alarm signal when the magnitude of the summed voltages exceeds the threshold voltage.

41. The method of claim 40, and further comprising the step of resetting the summation of the voltages each time the integrator alarm signal is generated.

42. The method of claim 30, and further comprising the step of modulating the light radiation to thereby transmit incident light beam pulses; and performing the detecting step only during time intervals when the returning light beam pulses are expected to be received.

* * * * *